US006481002B2

(12) United States Patent
Watanabe (10) Patent No.: US 6,481,002 B2
(45) Date of Patent: Nov. 12, 2002

(54) SYSTEM AND METHOD FOR COMPRESSING LSI MASK WRITING DATA

(75) Inventor: Susumu Watanabe, Kanagawa-Ken (JP)

(73) Assignee: Kabushiki Kaisha Toshiba (JP)

( * ) Notice: Subject to any disclaimer, the term of this patent is extended or adjusted under 35 U.S.C. 154(b) by 119 days.

(21) Appl. No.: 09/785,007

(22) Filed: Feb. 16, 2001

(65) Prior Publication Data

US 2001/0016937 A1 Aug. 23, 2001

(30) Foreign Application Priority Data

Feb. 17, 2000 (JP) ........................................ 2000-039240

(51) Int. Cl.⁷ .............................................. G06F 17/50
(52) U.S. Cl. ............................... 716/19; 716/19; 716/8; 716/11
(58) Field of Search ................................ 716/19, 8, 10, 716/11, 12, 13, 5; 395/500.11, 500.06; 364/490, 491

(56) References Cited

U.S. PATENT DOCUMENTS

| 5,654,898 | A | * | 8/1997 | Roetcisoender et al. | ........ 716/6 |
| 6,009,251 | A | * | 12/1999 | Ho et al. | ........ 716/5 |
| 6,075,934 | A | * | 6/2000 | Chiluvuri et al. | ........ 716/10 |
| 6,182,069 | B1 | * | 1/2001 | Niblack et al. | ........ 382/260 |
| 6,237,129 | B1 | * | 5/2001 | Patterson et al. | ........ 716/10 |

FOREIGN PATENT DOCUMENTS

| JP | 0 5-53295 | 3/1993 |
| JP | 10-172876 | 6/1998 |
| JP | 10-333317 | 12/1998 |

* cited by examiner

Primary Examiner—Vuthe Siek
Assistant Examiner—Binh Tat
(74) Attorney, Agent, or Firm—Gray Cary Ware & Freidenrich LLP (57) ABSTRACT

An LSI mask writing data compressing system and method according to the present invention generates first-coordinate-axial one-dimensional arrays for each individual layout pattern, each of which comprises individual layout patterns having the same shape repeatedly arranged at regular intervals in the direction of a first coordinate axis, second-coordinate-axial one-dimensional arrays for each individual layout pattern, each of which comprises individual layout patterns having the same shape repeatedly arranged at regular intervals in the direction of a second coordinate axis perpendicular to the first coordinate axis, two-dimensional arrays for each individual layout pattern, each of which comprises first-coordinate-axial one-dimensional arrays for each individual layout pattern repeatedly arranged at regular intervals in the direction of the second coordinate direction, a first-coordinate-axial block array of multiple layout patterns, which comprises grouped first-coordinate-axial one-dimensional arrays for each individual layout pattern, which include the same number of individual layout patterns repeatedly arranged at the same regular intervals in the direction of the first coordinate axis, a second-coordinate-axial block array of multiple layout patterns, which comprises grouped second-coordinate-axial one-dimensional arrays for each individual layout pattern, which include the same number of individual layout patterns repeatedly arranged at the same regular intervals in the direction of the second coordinate axis, and a two-dimensional block array of multiple layout patterns, which comprises grouped two-dimensional arrays of individual layout patterns, which include the same number of individual layout patterns repeatedly arranged at the same regular intervals, to convert data for each of the arrays to prepare writing data for a hierarchical cell.

11 Claims, 5 Drawing Sheets

SYSTEM AND METHOD FOR COMPRESSING LSI MASK WRITING DATA

CROSS REFERENCE TO RELATED APPLICATIONS

The subject application is related to subject matter disclosed in Japanese Patent Application No. 2000-39240 filed on Feb. 17, 2000 in Japan to which the subject application claims priority under Paris Convention and which is incorporated herein by reference.

BACKGROUND OF THE INVENTION

1. Field of the Invention

The present invention relates generally to a CAD tool and compressing method for compressing and preparing LSI mask writing data. More specifically, the invention relates to an LSI mask writing data compressing system and method for compressing flat design data to prepare writing data having a high compressibility in order to supply the prepared writing data to a mask lithography system of a vector scan system. The invention also relates to a recording medium in which a computer program for executing the LSI mask writing data compressing method has been recorded.

2. Related Background Art

The capacity of LSI mask writing data for use in a process for producing large scale integrated circuits is increasing with the increase of the scale of products, and recently, reaches several giga bytes. As a method for compressing writing data, the repeated expression of layout patterns is usually used. However, even if the compressing method using only the repeated expression of layout patterns is carried out, there is a limit to compressibility, and it is not possible to sufficiently cope with the increase of the scale of products in the present circumstances.

LSI mask lithography systems are divided broadly into raster scan systems and vector scan systems. The vector scan systems are easy to realize precise writing and high throughput, and are being mainly used for carrying out very large scale, precise LSC mask wiring.

Writing data in recent vector scan systems are expressed by a format having a hierarchical structure for the purpose of preparing writing data of a high compressibility for VLSI products.

LSI design data originally have a hierarchical structure, and are relatively easy to prepare mask writing data of a high compressibility using a hierarchical expression if direct mask writing data are prepared by converting the design data without processing the design data, and such preparation is actually in some cases.

However, since a complicated data processing including the logical operation of layout patterns, the dimensional correction of layout patterns, the proximity effect correction and so forth is actually carried out when design data are converted into mask writing data, the hierarchical structure of the design data can not been maintained, so that a part of the design data are usually flattened. In the worst case, the design data may have a completely flat structure.

Conventionally, when such flat design data having no hierarchical structure are handled, the repeated expression of layout patterns is widely used as the mask writing data compressing method. However, even if the compressing method using only the repeated expression of layout patterns is carried out, there is a limit to the compressibility of data. Therefore, in the case of the mask writing data of VLSI products, the size of data reaches several giga bytes.

For that reason, a mass of data are handled, so that there are problems in that it takes a lot of time to process mask writing data and that large-capacity working storage files are required for processing data on the side of a mask lithography system.

SUMMARY OF THE INVENTION

It is therefore an object of the present invention to eliminate the aforementioned problems and to provide an LSI mask writing data compressing system and method for preparing mask writing data having a very high compressibility using the hierarchical expression of mask writing data when the mask writing data are prepared from LSI design data having a flat structure having no hierarchical structure.

According to an LSI mask writing data compressing system of the present invention, there is provided an LSI mask writing data compressing system comprising:

an individual layout pattern one-dimensional array generating unit for generating first-coordinate-axial one-dimensional arrays for each individual layout pattern and second-coordinate-axial one-dimensional arrays for each individual layout pattern by using layout pattern data of unit section regions of LSI design data, which comprise a plurality of unit section regions and which correspond to the unit section regions of LSI mask writing data to be compressed, from layout patterns of the unit section regions, and for setting layout pattern data of the residual layout patterns as random layout pattern data, each of the first-coordinate-axial one-dimensional arrays for each individual layout pattern being formed by repeatedly arranging individual layout patterns having the same shape on an LSI mask writing plane at regular intervals in the direction of a first coordinate axis, each of the second-coordinate-axial one-dimensional arrays for each individual layout pattern being formed by repeatedly arranging individual layout patterns having the same shape on the LSI mask writing plane at regular intervals in the direction of a second coordinate axis perpendicular to the first coordinate axis;

an individual layout pattern two-dimensional array generating unit for generating two-dimensional arrays for each individual layout pattern from selected first-coordinate-axial one-dimensional arrays for each individual layout pattern, which are selected from the first-coordinate-axial one-dimensional arrays for each individual layout pattern, each of the selected first-coordinate-axial one-dimensional arrays for each individual layout pattern including the same number of the individual layout patterns having the same shape arranged at the same regular intervals in the direction of the first coordinate axis, each of the two-dimensional arrays for each individual layout pattern being formed by repeatedly arranging the selected first-coordinate-axial one-dimensional arrays for each individual layout pattern on the LSI mask writing plane at regular intervals in the direction of the second coordinate axis;

a multiple layout pattern block array generating unit for generating a first-coordinate-axial block array of multiple layout patterns from the residual first-coordinate-axial one-dimensional arrays for each individual layout pattern other than the selected first-coordinate-axial one-dimensional arrays for each individual layout pattern which have constituted any one of the two-dimensional arrays for each individual layout pattern, the first-coordinate-axial block array of multiple layout patterns being formed by grouping the same number of individual layout patterns repeatedly arranged at the same regular intervals in the direction of the first coordinate axis regardless of the shape of individual layout patterns included in the first-coordinate-axial block array of multiple layout patterns, for generating a second-coordinate-axial block array of multiple layout patterns from the residual second-coordinate-axial one-dimensional arrays for each individual layout pattern other than the selected second-coordinate-axial one-dimensional arrays for each individual layout pattern which have constituted any one of the two-dimensional arrays for each individual layout pattern, the second-coordinate-axial block array of multiple layout patterns being formed by grouping the same number of individual layout patterns repeatedly arranged at the same regular intervals in the direction of the second coordinate axis regardless of the shape of individual layout patterns included in the second-coordinate-axial block array of multiple layout patterns, and for generating a two-dimensional block array of multiple layout patterns from the two-dimensional arrays for each individual layout pattern, the two-dimensional block array of multiple layout patterns being formed by grouping the same number of individual layout patterns of the two-dimensional arrays of individual layout patterns repeatedly arranged at the same regular intervals regardless of the shape of individual layout patterns included in the two-dimensional arrays of individual layout patterns.

With this construction, it is possible to prepare mask writing data having a very high compressibility using a hierarchical expression of mask writing data, when the mask writing data are prepared from LSI design data having a flat structure with no hierarchical structure.

When LSI mask writing data are compressed, there are further provided a hierarchical cell writing data preparing unit for converting data of each of the arrays to prepare writing data for a hierarchical cell, and a random layout pattern writing data preparing unit for converting data for the random layout pattern to prepare writing data for the random layout pattern.

The multiple layout pattern block array generating unit may register data for the generated first-coordinate-axial block array of multiple layout patterns, the generated second-coordinate-axial block array of multiple layout patterns and the generated two-dimensional block array of multiple layout patterns in a predetermined block library, and the hierarchical cell writing data preparing unit may convert the data of each of the array to prepare the writing data for the hierarchical cell using the data for the first-coordinate-axial block array of multiple layout patterns, the second-coordinate-axial block array of multiple layout patterns and the two-dimensional block array of multiple layout patterns, which have been registered in the predetermined block library.

The multiple layout pattern block array generating unit may assign an identification number when the data for the generated first-coordinate-axial block array of multiple layout patterns, the generated second-coordinate-axial block array of multiple layout patterns or the generated two-dimensional block array of multiple layout patterns are registered in the predetermined block library, and add the identification number, which have been assigned to the data for the first-coordinate-axial block array of multiple layout patterns, the second-coordinate-axial block array of multiple layout patterns or the two-dimensional block array for multiple layout patterns, to the data for the first-coordinate-axial block array of multiple layout patterns, the second-coordinate-axial block array of multiple layout patterns or the two-dimensional block array for multiple layout patterns to avoid duplicated registration when the data for the first-coordinate-axial block array of multiple layout patterns, the second-coordinate-axial block array of multiple layout patterns or the two-dimensional block array of multiple layout patterns, which data have the same construction, have been registered in the predetermined block library.

There may be further provided a writing data preparation completion determining unit for total unit section region for determining whether the preparation of writing data for all of unit section regions is completed.

According to an LSI mask writing data compressing method of the present invention, there is provided an LSI mask writing data compressing method comprising:

a first step of generating first-coordinate-axial one-dimensional arrays for each individual layout pattern and second-coordinate-axial one-dimensional arrays for each individual layout pattern by using layout pattern data of unit section regions of LSI design data, which comprise a plurality of unit section regions and which correspond to the unit section regions of LSI mask writing data to be compressed, from layout patterns of the unit section regions, and of setting layout pattern data of the residual layout patterns as random layout pattern data, each of the first-coordinate-axial one-dimensional arrays for each individual layout pattern being formed by repeatedly arranging individual layout patterns having the same shape on an LSI mask writing plane at regular intervals in the direction of a first coordinate axis, each of the second-coordinate-axial one-dimensional arrays for each individual layout pattern being formed by repeatedly arranging individual layout patterns having the same shape on the LSI mask writing plane at regular intervals in the direction of a second coordinate axis perpendicular to the first coordinate axis;

a second step of generating two-dimensional arrays for each individual layout pattern from selected first-coordinate-axial one-dimensional arrays for each individual layout pattern, which are selected from the first-coordinate-axial one-dimensional arrays for each individual layout pattern, each of the selected first-coordinate-axial one-dimensional arrays for each individual layout pattern including the same number of the individual layout patterns having the same shape arranged at the same regular intervals in the direction of the first coordinate axis, each of the two-dimensional arrays for each individual layout pattern being formed by repeatedly arranging the selected first-coordinate-axial one-dimensional arrays for each individual layout pattern on the LSI mask writing plane at regular intervals in the direction of the second coordinate axis;

a third step of generating a first-coordinate-axial block array of multiple layout patterns from the residual first-coordinate-axial one-dimensional arrays for each individual layout pattern other than the selected first-coordinate-axial one-dimensional arrays for each individual layout pattern which have constituted any one of the two-dimensional arrays for each individual layout pattern, the first-coordinate-axial block array of multiple layout patterns being formed by grouping the same number of individual layout patterns repeatedly arranged at the same regular intervals in the direction of the first coordinate axis regardless of the shape of individual layout patterns included in the first-coordinate-axial block array of multiple layout patterns, and generating a second-coordinate-axial block array of multiple layout patterns from the residual second-coordinate-axial one-dimensional arrays for each individual layout pattern other than the selected second-coordinate-axial one-dimensional arrays for each individual layout pattern which have constituted any one of the two-dimensional arrays for each individual layout pattern, the second-coordinate-axial block array of multiple layout patterns being formed by grouping the same number of individual layout patterns repeatedly arranged at the same regular intervals in the direction of the second coordinate axis regardless of the shape of individual layout patterns included in the second-coordinate-axial block array of multiple layout patterns; and a fourth step of generating a two-dimensional block array of multiple layout patterns from the two-dimensional arrays for each individual layout pattern, the two-dimensional block array of multiple layout patterns being formed by grouping the same number of individual layout patterns of the two-dimensional arrays of individual layout patterns repeatedly arranged at the same regular intervals regardless of the shape of individual layout patterns included in the two-dimensional arrays of individual layout patterns.

With this construction, it is possible to prepare mask writing data having a very high compressibility using a hierarchical expression of mask writing data, when the mask writing data are prepared from LSI design data having a flat structure with no hierarchical structure.

When LSI mask writing data are compressed, there are further provided a fifth step of converting data of each of the arrays to prepare writing data for a hierarchical cell, and a sixth step of converting data for the random layout pattern to prepare writing data for the random layout pattern.

The third and fourth steps may register data for the generated first-coordinate-axial block array of multiple layout patterns, the generated second-coordinate-axial block array of multiple layout patterns and the generated two-dimensional block array of multiple layout patterns in a predetermined block library, and the fifth step may convert the data of each of the array to prepare the writing data for the hierarchical cell using the data for the first-coordinate-axial block array of multiple layout patterns, the second-coordinate-axial block array of multiple layout patterns and the two-dimensional block array of multiple layout patterns, which have been registered in the predetermined block library.

The third and fourth steps may assign an identification number when the data for the generated first-coordinate-axial block array of multiple layout patterns, the generated second-coordinate-axial block array of multiple layout patterns or the generated two-dimensional block array of multiple layout patterns are registered in the predetermined block library, and add the identification number, which have been assigned to the data for the first-coordinate-axial block array of multiple layout patterns, the second-coordinate-axial block array of multiple layout patterns or the two-dimensional block array for multiple layout patterns, to the data for the first-coordinate-axial block array of multiple layout patterns, the second-coordinate-axial block array of multiple layout patterns or the two-dimensional block array for multiple layout patterns to avoid duplicated registration when the data for the first-coordinate-axial block array of multiple layout patterns, the second-coordinate-axial block array of multiple layout patterns or the two-dimensional block array of multiple layout patterns, which data have the same construction, have been registered in the predetermined block library.

There may be further provided a seventh step of determining whether the preparation of writing data for all of unit section regions is completed.

A computer program recording medium according to the present invention is characterized in that a computer program for executing an LSI mask writing data compressing method according to the present invention in a computer system has been recorded therein.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of an LSI mask writing data compressing system and method according to the present invention will be described below.

Figure 1:
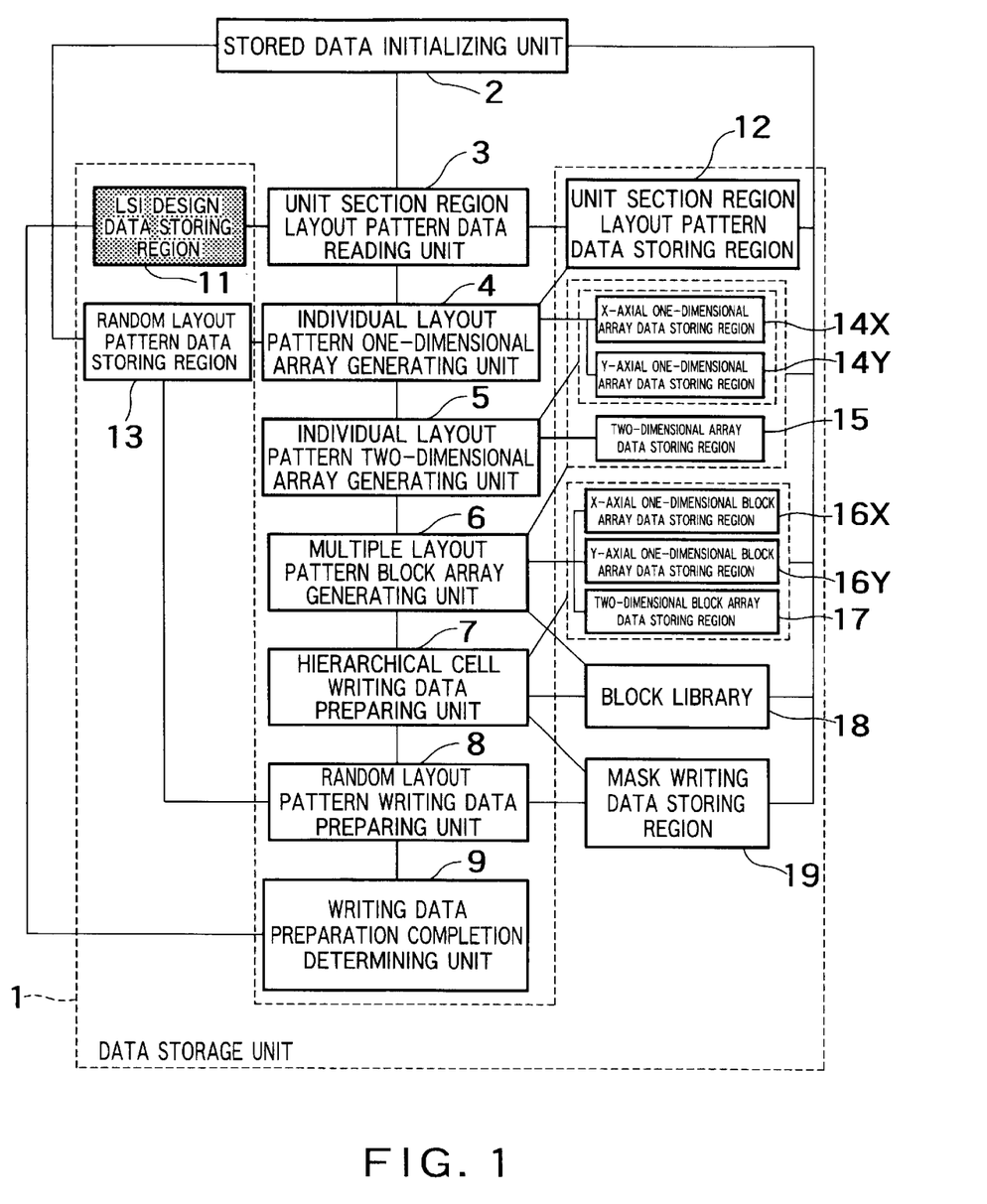
FIG. 1 is a block diagram showing the construction of an LSI mask writing data compressing system according to the present invention.
Figure 2:
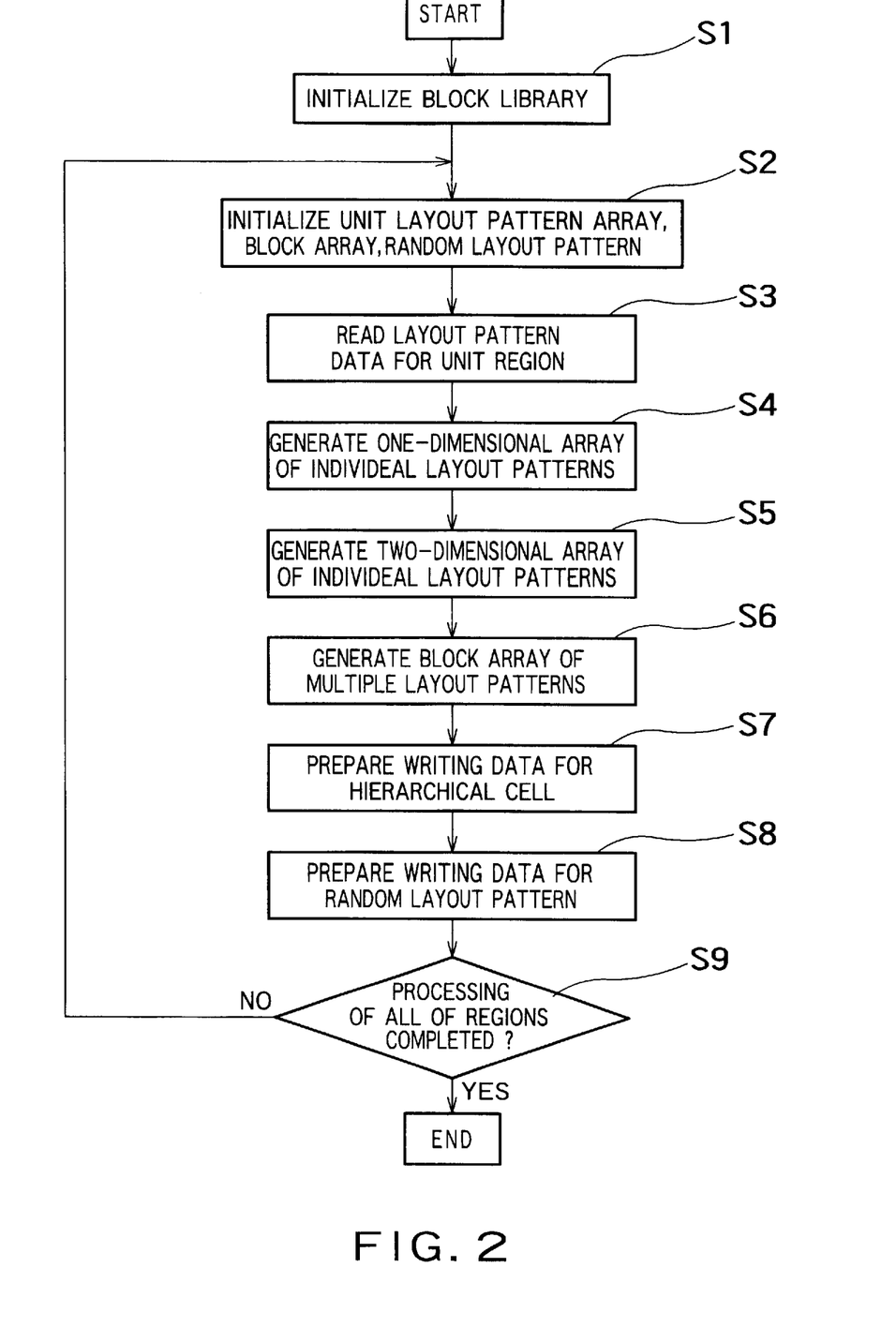
FIG. 2 is a flow chart showing the procedure for carrying out an LSI mask writing data compressing method according to the present invention.
Figure 3:
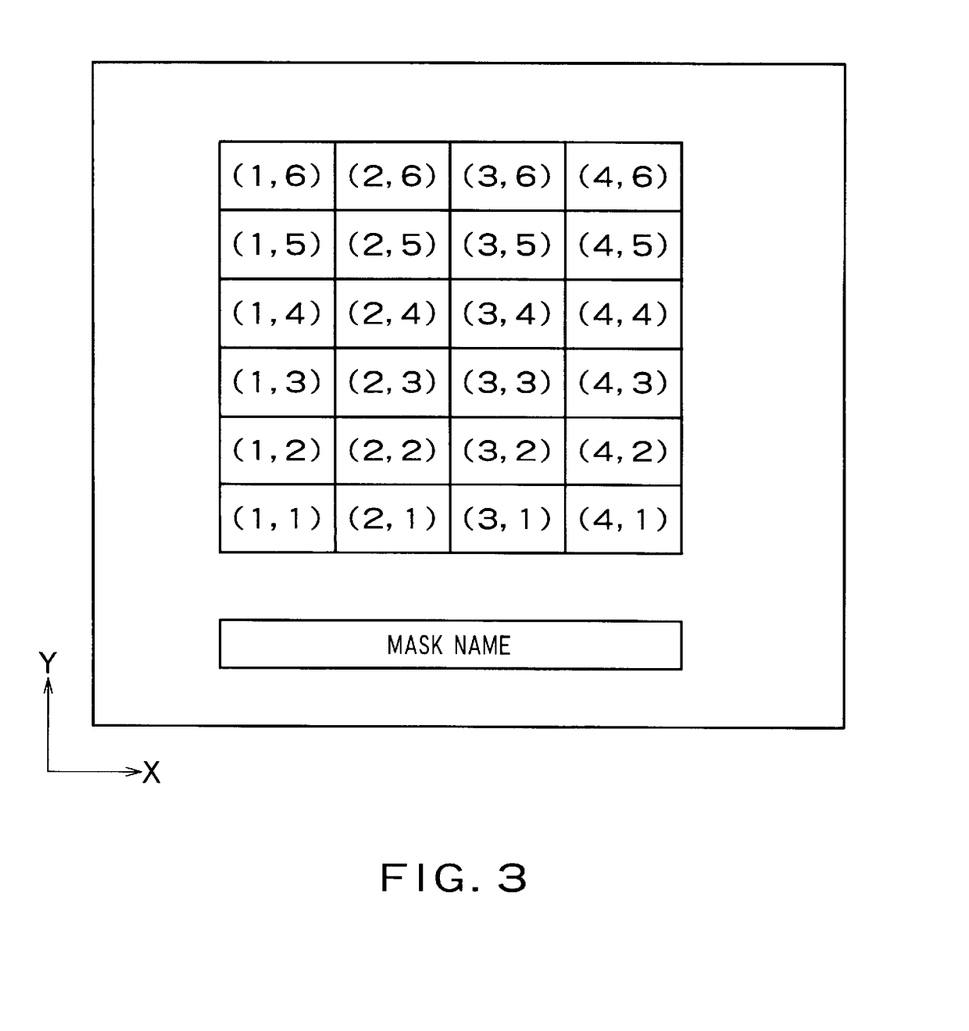
FIG. 3 is an illustration schematically showing an example of a schematic structure of LSI mask writing data so as to correspond to an LSI writing mask as a flat structure having no hierarchical structure.

FIG. 1 is a block diagram showing the construction of an LSI mask writing data compressing system according to the present invention. FIG. 2 is a flow chart showing the procedure for carrying out an LSI mask writing data compressing method according to the present invention. FIG. 3 is an illustration schematically showing an example of a schematic structure of LSI mask writing data so as to correspond to an LSI writing mask as a flat structure having no hierarchical structure.

The LSI mask writing data compressing system according to the present invention shown in FIG. 1 comprises: a data storage unit 1 for storing various data; a stored data initializing unit 2 for initializing various data which are stored in the data storage unit 1; a unit section region layout pattern data reading unit 3 for reading layout pattern data of unit section regions of LSI design data corresponding to unit section regions of LSI mask writing data, which are to be compressed, from the data storage unit 1; an individual layout pattern one-dimensional array generating unit 4 for generating X-axial one-dimensional arrays for each individual layout pattern or Y-axial one-dimensional arrays for each individual layout pattern, each of which comprises individual layout patterns having the same shape repeatedly arranged at regular intervals in X-axis or Y-axis directions, from layout patterns of the unit section region by using the read layout pattern data of the unit section regions, and for setting the residual layout pattern data as random layout pattern data; an individual layout pattern two-dimensional array generating unit 5 for generating two-dimensional arrays for each individual layout pattern, each of which comprises X-axial one-dimensional arrays for each individual layout pattern or Y-axial one-dimensional arrays for each individual layout pattern which are repeatedly arranged at regular intervals in Y-axis or X-axis directions, from the X-axial one-dimensional arrays for each individual layout pattern or the Y-axial one-dimensional arrays for each individual layout pattern, each of which comprises the same number of individual layout patterns having the same shape repeatedly arranged at the same regular intervals in X-axis or Y-axis directions, among the X-axial one-dimensional arrays for each individual layout pattern or the Y-axial one-dimensional arrays for each individual; a multiple layout pattern block array generating unit 6 for generating an X-axial block array of multiple layout patterns or a Y-axial block array of multiple layout patterns, which is formed by grouping the same number of individual layout patterns repeatedly arranged at the same regular intervals in X-axis or Y-axis directions regardless of the shape of the included individual layout patterns, from X-axial one-dimensional arrays for each individual layout pattern or Y-axial one-dimensional arrays for each individual layout pattern other than the X-axial one-dimensional arrays for each individual layout pattern or the Y-axial one-dimensional arrays for each individual layout pattern which have constituted any one of the two-dimensional arrays for each individual layout pattern, and for generating a two-dimensional block array of multiple layout patterns, which is formed by grouping two-dimensional arrays of the same number of individual layout patterns repeatedly arranged at the same regular intervals regardless of the shape of the included individual layout patterns, from two-dimensional arrays of individual layout patterns; a hierarchical cell writing data preparing unit 7 for converting data of each array to prepare writing data of a hierarchical cell; a random layout pattern writing data preparing unit 8 for converting random layout pattern data to prepare writing data for random layout patterns; and a writing data preparation completion determining unit 9 for total unit section region for determining whether the preparation of writing data for all of unit section regions is completed. In the example shown in FIG. 1, LSI design data serving as the base of LSI mask writing data have been stored in the LSI design data storing region 11 of the data storage unit 1. However, the LSI design data may be stored in a data storage unit other than the data storage unit 1.

When an example of a schematic structure of LSI mask writing data is schematically illustrated so as to correspond to an LSI writing mask as a flat structure having no hierarchical structure, as shown in FIG. 3, the LSI mask writing data are divided into unit section regions having a size according to the kind of a mask lithography system, and the lithography layout pattern data are distributed to be stored in each unit section region. The unit section region of the LSI mask writing data means a range in which the mask lithography system writes at a time. The unit section region of the LSI mask writing data is determined, in the case of an electron beam lithography system, by a scan width of an electron beam or a unit size of data which are transferred from a lithography control computer to the lithography system. In the example shown in FIG. 3, a data storing region is divided into four parts in X-axis directions and six parts in Y-axis directions on an LSI mask writing plane to be divided into 24 parts. The LSI design data serving as the base of the LSI mask writing data can also be read out every unit section region corresponding to the unit section region of the LSI mask writing data.

An LSI mask writing data compressing method according to the present invention is carried out by the above described LSI mask writing data compressing system according to the present invention. Therefore, referring to FIG. 2, the operation of the LSI mask writing data compressing system according to the present invention, i.e., the procedure for carrying out an LSI mask writing data compressing method according to the present invention, will be described below.

First, a block library 18 of the data storage unit 1 is initialized by the stored data initializing unit 2 to set the number of block data stored in the block library 18 to be zero (step S1). The compression of LSI mask writing data, i.e., the preparation of hierarchical cell, is carried out every unit section region. The preparation of the block library 18 is carried out every LSI mask writing data, i.e., with respect to all of one LSI mask writing data. Therefore, data of the block library 18 are stored every time data compression is carried out every unit section region, and are stored until the compression of all of one LSI mask writing data is completed. For that reason, the initialization of the block library 18 is carried out only once when the compression of all of one LSI mask writing data is started.

When block data are stored in the block library 18 every time data compression is carried out every unit section region, it is determined if block data having the same contents have been stored as will be described later, in order to avoid duplicated registration.

After the block library 18 is initialized, a unit section region layout pattern data storing region 12, a random layout pattern data storing region 13, an X-axial one-dimensional array data storing region 14X, an Y-axial one-dimensional array data storing region 14Y, a two-dimensional array data storing region 15, an X-axial one-dimensional block array data storing region 16X, a Y-axial one-dimensional block array data storing region 16Y, a two-dimensional block array data storing region 17 and a mask writing data storing region 19, which are provided in the data storage unit 1, are initialized by the stored data initializing unit 2, respectively (step S2).

The initialization of the block library 18 is carried out only once when the compression of all of one LSI mask writing data is started, whereas each of the data storing regions prepared every unit section region is initialized every unit section region. Therefore, the initialization of each of the data storing regions every unit section region is carried out every unit section region when data compression in each unit section region is started.

Furthermore, the LSI design data serving as the base of the preparation of the LSI mask writing data may be previously stored in the LSI design data storing region 11 of the data storage unit 1 or another data storage unit before the initialization of the block library 18, or may be stored in the LSI design data storing region 11 of the data storage unit 1 or another data storage unit after the initialization of the block library 18. Alternatively, the LSI design data may be stored in the LSI design data storing region 11 of the data storage unit 1 or another data storage unit after the initialization of each of the data storing regions of the first unit section region.

After the initialization of each of the data storing regions of the unit section region is carried out, layout pattern data of a unit section region of LSI design data corresponding to a unit section region, which is to be compressed, i.e., the hierarchical cell of which is to be prepared, are read out from the LSI design data storing region 11 of the data storage unit 1 or another data storage unit by means of the unit section region layout pattern data reading unit 3 (step S3). The layout pattern data for the read unit section region are stored in the unit section region layout pattern data storing region 12, which is a part of a work file, to be used as data to be processed in the subsequent processing.

After the layout pattern data for the unit section region are read out, the individual layout pattern one-dimensional array generating unit 4 uses layout pattern data for the unit section region to detect layout patterns having the same shape, such as square, rectangle, trapezoid or triangle, from the layout patterns of the unit section region to divide the layout patterns of the unit section region into sets of the detected layout patterns, each set of which has the same shape, to detect layout patterns, which are repeatedly arranged at regular intervals in X-axis directions, from each of the sets to generate an X-axial one-dimensional array every layout pattern having the same shape, i.e., every individual layout pattern, to store X-axial one-dimensional array data for each individual layout pattern in the X-axial one-dimensional array data storing region 14X. In addition, with respect to layout patterns which are included in each of the sets of layout patterns having the same shape and which have not been included in the X-axial one-dimensional array for each individual layout pattern, layout patterns repeatedly arranged at regular intervals in Y-axis directions are detected from each of the sets to generate a Y-axial one-dimensional array every layout pattern having the same shape, i.e., every individual layout pattern, to store Y-axial one-dimensional array data for each individual layout pattern in the Y-axial one-dimensional array data storing unit 14Y. Layout pattern data for each layout pattern, which have not been included in any one of the X-axial one-dimensional array for each individual layout pattern and the Y-axial one-dimensional array for each individual layout pattern, are stored in the random layout pattern data storing region 13 as random layout pattern data (step S4).

After the X-axial one-dimensional array for each individual layout pattern and the Y-axial one-dimensional array for each individual layout pattern are generated, the individual layout pattern two-dimensional array generating unit 5 detects an X-axial one-dimensional array for each of individual layout patterns, which are repeatedly arranged at regular intervals in Y-axis directions, from the X-axial one-dimensional arrays for each individual layout pattern, each of which includes the same number of individual layout patterns having the same shape repeatedly arranged at the same regular intervals in X-axis directions, among the X-axial one-dimensional array for each individual layout pattern, to generate a two-dimensional array every layout pattern having the same shape, i.e., every individual layout pattern, to store two-dimensional array data for each individual layout pattern in the two-dimensional array data storing region 15 (step S5). An identification flag is herein added to the X-axial one-dimensional array for each individual layout pattern, which have constituted any one of the two-dimensional arrays for each individual layout pattern.

After the two-dimensional arrays for each individual layout pattern are produced, the multiple layout pattern block array generating unit 6 generates an X-axial block array of multiple layout patterns by grouping the same number of individual layout patterns, which are repeatedly arranged at the same regular intervals in X-axis directions regardless of the shape of the included individual layout patterns, from X-axial one-dimensional arrays for each individual layout pattern other than the X-axial one-dimensional arrays for each individual layout pattern which have constituted any one of the two-dimensional arrays for each individual layout pattern, to store the generated X-axial block array of multiple layout patterns in the X-axial block array storing region 16X for multiple layout patterns. Similarly, the multiple layout pattern block array generating unit 6 generates a Y-axial block array of multiple layout patterns by grouping the same number of individual layout patterns, which are repeatedly arranged at the same regular intervals in Y-axis directions regardless of the shape of the included individual layout patterns, from Y-axial one-dimensional arrays for each individual layout pattern, to store the generated Y-axial block array of multiple layout patterns in the Y-axial block array storing region 16Y for multiple layout patterns. The X-axial one-dimensional array for each individual layout pattern, which have constituted any one of the two-dimensional arrays for each individual layout pattern, are identified and excluded by the identification flag added as described above.

Moreover, the multiple layout pattern block array generating unit 6 generates a two-dimensional block array of multiple layout patterns, which are formed by grouping the same number of two-dimensional arrays of individual layout patterns repeatedly arranged at the same regular intervals regardless of the shape of the included individual layout patterns, from the two-dimensional arrays of individual layout patterns to store two-dimensional block array data for multiple layout patterns in the two-dimensional block array data storing region 17 for multiple layout pattern.

The X-axial block array data for multiple layout patterns, the Y-axial block array data for multiple layout patterns and the two-dimensional block array data for multiple layout patterns, which have been thus generated for the X-axial block array of multiple layout patterns, the Y-axial block array of multiple layout patterns and the two-dimensional block array of multiple layout patterns, respectively, are sequentially registered in the block library 18. During the registration, it is determined if block array data having the same construction have been registered. When block array data having the same construction have not been registered, a new registration number is assigned to the block array data which is newly registered in the block library 18, and the registration number, together with the block data, is stored in any one of the X-axial block array storing region 16X for multiple layout patterns, the Y-axial block array storing region 16Y for multiple layout patterns and the two-dimensional block array data storing region 17 for multiple layout patterns, in which the block array data have been stored. On the other hand, when block array data having the same construction have been registered, the registration number is read out from the block library 18, and the registration number, together with the block array data, is stored in any one of the X-axial block array storing region 16X for multiple layout patterns, the Y-axial block array storing region 16Y for multiple layout patterns and the two-dimensional block array data storing region 17 for multiple layout patterns, in which the block array data have been stored (step S6).

After each block array data is generated and registered in the block library 18, the hierarchical cell writing data preparing unit 7 sequentially reads block array data out of the block library 18 to convert the read block array data to prepare a hierarchical cell of writing data. The hierarchical cell writing data preparing unit 7 also reads X-axial block array data for multiple layout patterns, Y-axial block array data for multiple layout patterns and two-dimensional block array data for multiple layout patterns from the X-axial block array storing region 16X for multiple layout patterns, the Y-axial block array storing region 16Y for multiple layout patterns and the two-dimensional block array data storing region 17 for multiple layout patterns, and adds reference information of the hierarchical cell to the read two-dimensional block array data for multiple layout patterns to convert the resulting data to prepare writing data (step S7).

After the writing data of the hierarchical cell are prepared, the random layout pattern writing data preparing unit 8 reads random layout pattern data from the random layout pattern data storing region 13 to convert the read random layout pattern data to prepare writing data (step S8).

After the random layout pattern data are converted to prepare the writing data, the writing data preparation completion determining unit 9 for total unit section region determines whether the preparation of writing data of all of unit section region has been completed (step S9). This determination is carried out by causing the writing data preparation completion determining unit 9 for total unit section region to access the unit section region layout pattern data reading unit 3 or the LSI design data storing region 11 to determine if the unit section region layout pattern data reading unit 3 has read the layout pattern data for all of unit section regions of LSI design data.

When the conversion of the layout pattern data for all of unit section regions to prepare writing data is completed, the LSI mask writing data compression carried out by preparing writing data due to the conversion of the LSI design data 11 is completed. When there is a remaining unit section region in which the preparation of writing data due to the conversion of layout pattern data has not been completed, the routine returns to the above described step 2 to repeat the process at steps 2 through 9 with respect to the remaining unit section regions.

The results of comparison of a data compressibility in an LSI mask writing data compressing system and method according to the present invention with a data compressibility in the prior art are shown below. It was assumed that the data compressibility $K_p$ in the LSI mask writing data compressing system and method according to the present invention is a compressibility in a hierarchical cell expression as described above. It was also assumed that the data compressibility $K_c$ in the prior art is a compressibility in a repeated expression. Therefore, $K_p$ and $K_c$ are expressed as follows.

$K_p$=Data Size With No Compression Expression/Data Size In Hierarchical Cell Expression Compression $K_c$=Data Size With No Compression Expression/Data Size In Repeated Expression Compression Assuming that the number of bytes of repeated multiple layout patterns in a unit section region is REPbyte, the number of repetition in the unit section region is REPcount, the number of bytes of a random layout pattern in the unit section region is RANbyte, and the number of unit section regions of a writing mask is SECcount, then, the respective data sizes are expressed as follows.

Data Size With No Compression Expression=((REPbyte×REPcount)+RANbyte)×SECcount

Data Size In Hierarchical Cell Expression Compression=REPbyte+ (RANbyte×SECcount)

Data Size In Repeated Expression Compression=(REPbyte+RANbyte)×SECcount

In the provisional calculations, it was assumed that the number of unit section regions of a writing mask is SECcount=10,000, the area of the writing mask region is 10 cm×10 cm, the size of the unit section region is 1,000 $\mu$m×1,000 $\mu$m, and the repeated number in the unit section region is REPcount=100.

The data size was set so as to be able to ignore a repeated interval and a repeated number, which were actually required for the repeated layout pattern expression, and a cell reference and a cell header which were actually required for the hierarchical cell expression.

Under the above described conditions, $K_c$ is about 50 and $K_p$ is about 101 assuming that RANbyte=100 kilobytes and REPbyte=100 kilobytes, and $K_c$ is about 100 and $K_p$ is about 1001 assuming that RANbyte=10 kilobytes and REPbyte is 100 kilobytes. That is, when the number of bytes of random layout patterns and the number of bytes of repeated layout patterns are equal to 100 kilobytes, the compressibility of only the repeated expression in the prior art is 1/50, whereas the compressibility of the hierarchical cell expression according to the present invention is 1/101. On the other hand, when the number of bytes of random layout patterns is 10 kilobytes and the number of bytes of repeated layout patterns is 100 kilobytes, the compressibility of only the repeated expression in the prior art is 1/100, whereas the compressibility of the hierarchical cell expression according to the present invention is 1/1001.

According to the LSI mask writing data compressing system and method according to the present invention, even in the case of flat design data, a hierarchical cell of a multiple layout pattern group is found to convert the flat design data to prepare mask writing data having a hierarchical structure. Therefore, as can be seen from the above described results of provisional calculations, there is an advantage in that it is possible to remarkably improve the compressibility particularly in the compression of memory LSI mask writing data, most of which are occupied by regularly repeated layout patterns.

As a result, since the quantity of data to be handled is greatly decreased, it is possible to greatly shorten the time required to process mask writing data, and it is possible to greatly decrease the capacity of a working storage file for data processing on the side of the mask writing system, so that it is possible to greatly improve efficiency in a process for producing an LSI mask.

Furthermore, the mask lithography system using LSI mask writing data compressed by the LSI mask writing data compressing system and method according to the present invention should not be limited to the mask lithography system of the vector scan system, but the mask lithography system may be any one of mask lithography systems capable of describing a hierarchical structure expression in LSI mask writing data.

Figure 4:
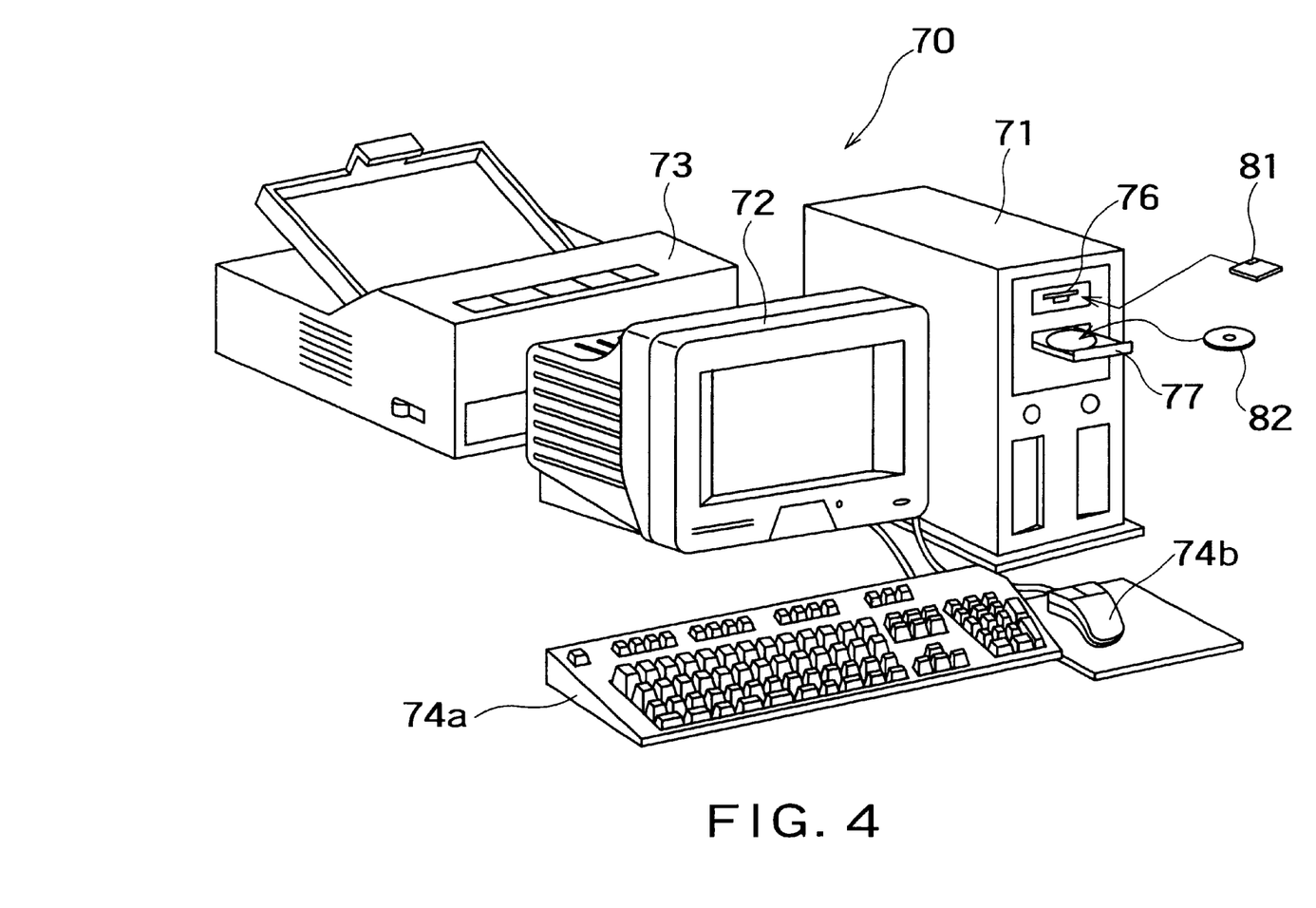
FIG. 4 is an illustration showing the appearance of a recording medium in which a program for executing an LSI mask writing data compressing method according to the present invention has been recorded, and the appearance of a computer system in which the recording medium is used.
Figure 5:
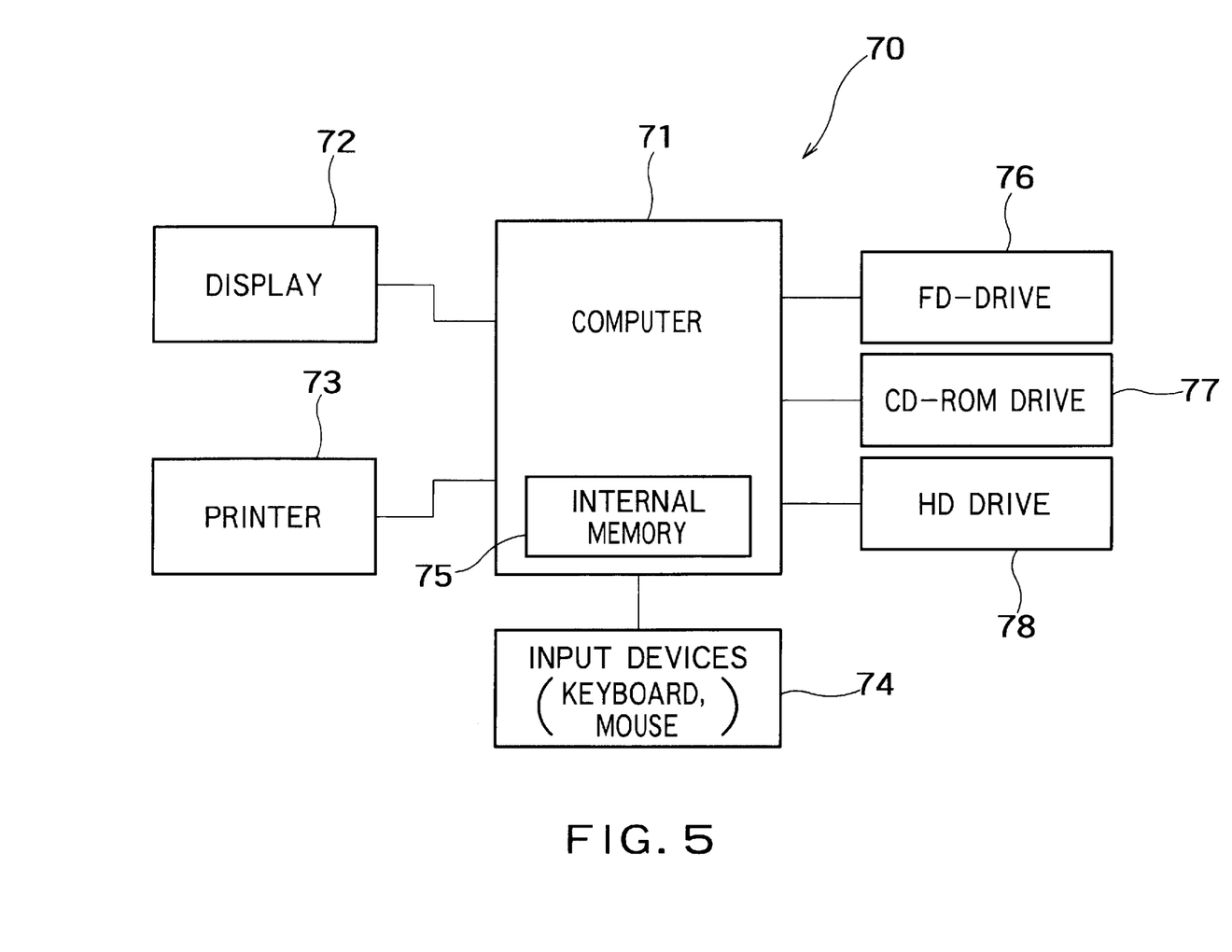
FIG. 5 is a block diagram showing the construction of the computer system shown in FIG. 4.

FIG. 4 is an illustration showing the appearance of a recording medium in which a computer program for executing an LSI mask writing data compressing method according to the present invention has been recorded, and the appearance of a computer system in which the recording medium is used, and FIG. 5 is a block diagram showing the construction of the computer system shown in FIG. 4.

The computer system 70 shown in FIG. 4 comprises: a computer body 71 housed in a housing such as a mini-tower type housing; a display device 72 such as a CRT (Cathode Ray Tube), a plasma display or a liquid crystal display; a printer 73 serving as a recording output unit; a keyboard 74a and mouse 74b serving as an input unit; a flexible disk drive unit 76; and a CD-ROM drive unit 77. FIG. 5 shows the construction of the computer system 70 as a block diagram. In the housing in which the computer system 71 is housed, an internal memory 75 such as a RAM (Random Access Memory), and an external memory such as a hard disk drive unit 78 are further provided. A recording medium in which a computer program for executing an LSI mask writing data compressing method according to the present invention has been recorded is used in the computer system 70. As an example of the recording medium, a flexible disk 81 or a CR-ROM (Read Only Memory) 82 is used. Alternatively, the recording medium may be an MO (Magneto Optical) disk, a DVD (Digital Versatile Disk), another optical recording disk, a card memory or a magnetic tape.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An LSI mask writing data compressing system comprising:

an individual layout pattern one-dimensional array generating unit for generating first-coordinate-axial one-dimensional arrays for each individual layout pattern and second-coordinate-axial one-dimensional arrays for each individual layout pattern by using layout pattern data of unit section regions of LSI design data, which comprise a plurality of unit section regions and which correspond to said unit section regions of LSI mask writing data to be compressed, from layout patterns of said unit section regions, and for setting layout pattern data of the residual layout patterns as random layout pattern data, each of said first-coordinate-axial one-dimensional arrays for each individual layout pattern being formed by repeatedly arranging individual layout patterns having the same shape on an LSI mask writing plane at regular intervals in the direction of a first coordinate axis, each of said second-coordinate-axial one-dimensional arrays for each individual layout pattern being formed by repeatedly arranging individual layout patterns having the same shape on the LSI mask writing plane at regular intervals in the direction of a second coordinate axis perpendicular to said first coordinate axis;

an individual layout pattern two-dimensional array generating unit for generating two-dimensional arrays for each individual layout pattern from selected first-coordinate-axial one-dimensional arrays for each individual layout pattern, which are selected from said first-coordinate-axial one-dimensional arrays for each individual layout pattern, each of said selected first-coordinate-axial one-dimensional arrays for each individual layout pattern including the same number of said individual layout patterns having the same shape arranged at the same regular intervals in the direction of said first coordinate axis, each of said two-dimensional arrays for each individual layout pattern being formed by repeatedly arranging said selected first-coordinate-axial one-dimensional arrays for each individual layout pattern on said LSI mask writing plane at regular intervals in the direction of said second coordinate axis;

a multiple layout pattern block array generating unit for generating a first-coordinate-axial block array of multiple layout patterns from the residual first-coordinate-axial one-dimensional arrays for each individual layout pattern other than said selected first-coordinate-axial one-dimensional arrays for each individual layout pattern which have constituted any one of said two-dimensional arrays for each individual layout pattern, said first-coordinate-axial block array of multiple layout patterns being formed by grouping the same number of individual layout patterns repeatedly arranged at the same regular intervals in the direction of said first coordinate axis regardless of the shape of individual layout patterns included in said first-coordinate-axial block array of multiple layout patterns, for generating a second-coordinate-axial block array of multiple layout patterns from the residual second-coordinate-axial one-dimensional arrays for each individual layout pattern other than said selected second-coordinate-axial one-dimensional arrays for each individual layout pattern which have constituted any one of said two-dimensional arrays for each individual layout pattern, said second-coordinate-axial block array of multiple layout patterns being formed by grouping the same number of individual layout patterns repeatedly arranged at the same regular intervals in the direction of said second coordinate axis regardless of the shape of individual layout patterns included in said second-coordinate-axial block array of multiple layout patterns, and for generating a two-dimensional block array of multiple layout patterns from said two-dimensional arrays for each individual layout pattern, said two-dimensional block array of multiple layout patterns being formed by grouping the same number of individual layout patterns of said two-dimensional arrays of individual layout patterns repeatedly arranged at the same regular intervals regardless of the shape of individual layout patterns included in said two-dimensional arrays of individual layout patterns.

2. An LSI mask writing data compressing system as set forth in claim 1, which further comprises:

a hierarchical cell writing data preparing unit for converting data of each of said arrays to prepare writing data for a hierarchical cell; and a random layout pattern writing data preparing unit for converting said random layout pattern data to prepare writing data for a random layout pattern.

3. An LSI mask writing data compressing system as set forth in claim 2, wherein said multiple layout pattern block array generating unit registers data for the generated first-coordinate-axial block array of multiple layout patterns, the generated second-coordinate-axial block array of multiple layout patterns and the generated two-dimensional block array of multiple layout patterns in a predetermined block library, and said hierarchical cell writing data preparing unit converts said data of each of said array to prepare said writing data for said hierarchical cell using said data for said first-coordinate-axial block array of multiple layout patterns, said second-coordinate-axial block array of multiple layout patterns and said two-dimensional block array of multiple layout patterns, which have been registered in said predetermined block library.

4. An LSI mask writing data compressing system as set forth in claim 3, wherein said multiple layout pattern block array generating unit assigns an identification number when said data for the generated first-coordinate-axial block array of multiple layout patterns, the generated second-coordinate-axial block array of multiple layout patterns or the generated two-dimensional block array of multiple layout patterns are registered in said predetermined block library, and adds said identification number, which have been assigned to said data for said first-coordinate-axial block array of multiple layout patterns, said second-coordinate-axial block array of multiple layout patterns or said two-dimensional block array for multiple layout patterns, to said data for said first-coordinate-axial block array of multiple layout patterns, said second-coordinate-axial block array of multiple layout patterns or said two-dimensional block array for multiple layout patterns to avoid duplicated registration when said data for the first-coordinate-axial block array of multiple layout patterns, the second-coordinate-axial block array of multiple layout patterns or the two-dimensional block array of multiple layout patterns, which data have the same construction, have been registered in said predetermined block library.

5. An LSI mask writing data compressing system as set forth in claim 2, which further comprises a writing data preparation completion determining unit for total unit section region for determining whether the preparation of writing data for all of unit section regions is completed.

6. An LSI mask writing data compressing method comprising:
   a first step of generating first-coordinate-axial one-dimensional arrays for each individual layout pattern and second-coordinate-axial one-dimensional arrays for each individual layout pattern by using layout pattern data of unit section regions of LSI design data, which comprise a plurality of unit section regions and which correspond to said unit section regions of LSI mask writing data to be compressed, from layout patterns of said unit section regions, and of setting layout pattern data of the residual layout patterns as random layout pattern data, each of said first-coordinate-axial one-dimensional arrays for each individual layout pattern being formed by repeatedly arranging individual layout patterns having the same shape on an LSI mask writing plane at regular intervals in the direction of a first coordinate axis, each of said second-coordinate-axial one-dimensional arrays for each individual layout pattern being formed by repeatedly arranging individual layout patterns having the same shape on said LSI mask writing plane at regular intervals in the direction of a second coordinate axis perpendicular to said first coordinate axis;
   a second step of generating two-dimensional arrays for each individual layout pattern from selected first-coordinate-axial one-dimensional arrays for each individual layout pattern, which are selected from said first-coordinate-axial one-dimensional arrays for each individual layout pattern, each of said selected first-coordinate-axial one-dimensional arrays for each individual layout pattern including the same number of said individual layout patterns having the same shape arranged at the same regular intervals in the direction of said first coordinate axis, each of said two-dimensional arrays for each individual layout pattern being formed by repeatedly arranging said selected first-coordinate-axial one-dimensional arrays for each individual layout pattern on said LSI mask writing plane at regular intervals in the direction of said second coordinate axis;
   a third step of generating a first-coordinate-axial block array of multiple layout patterns from the residual first-coordinate-axial one-dimensional arrays for each individual layout pattern other than said selected first-coordinate-axial one-dimensional arrays for each individual layout pattern which have constituted any one of said two-dimensional arrays for each individual layout pattern, said first-coordinate-axial block array of multiple layout patterns being formed by grouping the same number of individual layout patterns repeatedly arranged at the same regular intervals in the direction of said first coordinate axis regardless of the shape of individual layout patterns included in said first-coordinate-axial block array of multiple layout patterns, and generating a second-coordinate-axial block array of multiple layout patterns from the residual second-coordinate-axial one-dimensional arrays for each individual layout pattern other than said selected second-coordinate-axial one-dimensional arrays for each individual layout pattern which have constituted any one of said two-dimensional arrays for each individual layout pattern, said second-coordinate-axial block array of multiple layout patterns being formed by grouping the same number of individual layout patterns repeatedly arranged at the same regular intervals in the direction of said second coordinate axis regardless of the shape of individual layout patterns included in said second-coordinate-axial block array of multiple layout patterns; and
   a fourth step of generating a two-dimensional block array of multiple layout patterns from said two-dimensional arrays for each individual layout pattern, said two-dimensional block array of multiple layout patterns being formed by grouping the same number of individual layout patterns of said two-dimensional arrays of individual layout patterns repeatedly arranged at the same regular intervals regardless of the shape of individual layout patterns included in said two-dimensional arrays of individual layout patterns.

7. An LSI mask writing data compressing method as set forth in claim 6, which further comprises:
   a fifth step of converting data of each of said arrays to prepare writing data for a hierarchical cell; and
   a sixth step of converting said random layout pattern data to prepare writing data for a random layout pattern.

8. An LSI mask writing data compressing method as set forth in claim 7, wherein said third and fourth steps register data for the generated first-coordinate-axial block array of multiple layout patterns, the generated second-coordinate-axial block array of multiple layout patterns and the generated two-dimensional block array of multiple layout patterns in a predetermined block library, and
   said fifth step converts said data of each of said array to prepare said writing data for said hierarchical cell using said data for said first-coordinate-axial block array of multiple layout patterns, said second-coordinate-axial block array of multiple layout patterns and said two-dimensional block array of multiple layout patterns, which have been registered in said predetermined block library.

9. An LSI mask writing data compressing method as set forth in claim 8, wherein said third and fourth steps assign an identification number when said data for the generated first-coordinate-axial block array of multiple layout patterns, the generated second-coordinate-axial block array of multiple layout patterns or the generated two-dimensional block array of multiple layout patterns are registered in said predetermined block library, and adds said identification number, which have been assigned to said data for said first-coordinate-axial block array of multiple layout patterns, said second-coordinate-axial block array of multiple layout patterns or said two-dimensional block array for multiple layout patterns, to said data for said first-coordinate-axial block array of multiple layout patterns, said second-coordinate-axial block array of multiple layout patterns or said two-dimensional block array for multiple layout patterns to avoid duplicated registration when said data for the first-coordinate-axial block array of multiple layout patterns, the second-coordinate-axial block array of multiple layout patterns or the two-dimensional block array of multiple layout patterns, which data have the same construction, have been registered in said predetermined block library.

10. An LSI mask writing data compressing method as set forth in claim 7, which further comprises a seventh step of determining whether the preparation of writing data for all of unit section regions is completed.

11. A computer program recording medium in which a computer program for executing an LSI mask writing data compressing method in a computer system has been recorded, said LSI mask writing data compressing method comprising:

a first step of generating first-coordinate-axial one-dimensional arrays for each individual layout pattern and second-coordinate-axial one-dimensional arrays for each individual layout pattern by using layout pattern data of unit section regions of LSI design data, which comprise a plurality of unit section regions and which correspond to said unit section regions of LSI mask writing data to be compressed, from layout patterns of said unit section regions, and of setting layout pattern data of the residual layout patterns as random layout pattern data, each of said first-coordinate-axial one-dimensional arrays for each individual layout pattern being formed by repeatedly arranging individual layout patterns having the same shape on an LSI mask writing plane at regular intervals in the direction of a first coordinate axis, each of said second-coordinate-axial one-dimensional arrays for each individual layout pattern being formed by repeatedly arranging individual layout patterns having the same shape on said LSI mask writing plane at regular intervals in the direction of a second coordinate axis perpendicular to said first coordinate axis;

a second step of generating two-dimensional arrays for each individual layout pattern from selected first-coordinate-axial one-dimensional arrays for each individual layout pattern, which are selected from said first-coordinate-axial one-dimensional arrays for each individual layout pattern, each of said selected first-coordinate-axial one-dimensional arrays for each individual layout pattern including the same number of said individual layout patterns having the same shape arranged at the same regular intervals in the direction of said first coordinate axis, each of said two-dimensional arrays for each individual layout pattern being formed by repeatedly arranging said selected first-coordinate-axial one-dimensional arrays for each individual layout pattern on said LSI mask writing plane at regular intervals in the direction of said second coordinate axis;

a third step of generating a first-coordinate-axial block array of multiple layout patterns from the residual first-coordinate-axial one-dimensional arrays for each individual layout pattern other than said selected first-coordinate-axial one-dimensional arrays for each individual layout pattern which have constituted any one of said two-dimensional arrays for each individual layout pattern, said first-coordinate-axial block array of multiple layout patterns being formed by grouping the same number of individual layout patterns repeatedly arranged at the same regular intervals in the direction of said first coordinate axis regardless of the shape of individual layout patterns included in said first-coordinate-axial block array of multiple layout patterns, and generating a second-coordinate-axial block array of multiple layout patterns from the residual second-coordinate-axial one-dimensional arrays for each individual layout pattern other than said selected second-coordinate-axial one-dimensional arrays for each individual layout pattern which have constituted any one of said two-dimensional arrays for each individual layout pattern, said second-coordinate-axial block array of multiple layout patterns being formed by grouping the same number of individual layout patterns repeatedly arranged at the same regular intervals in the direction of said second coordinate axis regardless of the shape of individual layout patterns included in said second-coordinate-axial block array of multiple layout patterns; and a fourth step of generating a two-dimensional block array of multiple layout patterns from said two-dimensional arrays for each individual layout pattern, said two-dimensional block array of multiple layout patterns being formed by grouping the same number of individual layout patterns of said two-dimensional arrays of individual layout patterns repeatedly arranged at the same regular intervals regardless of the shape of individual layout patterns included in said two-dimensional arrays of individual layout patterns.

* * * * *